Patented Mar. 27, 1951

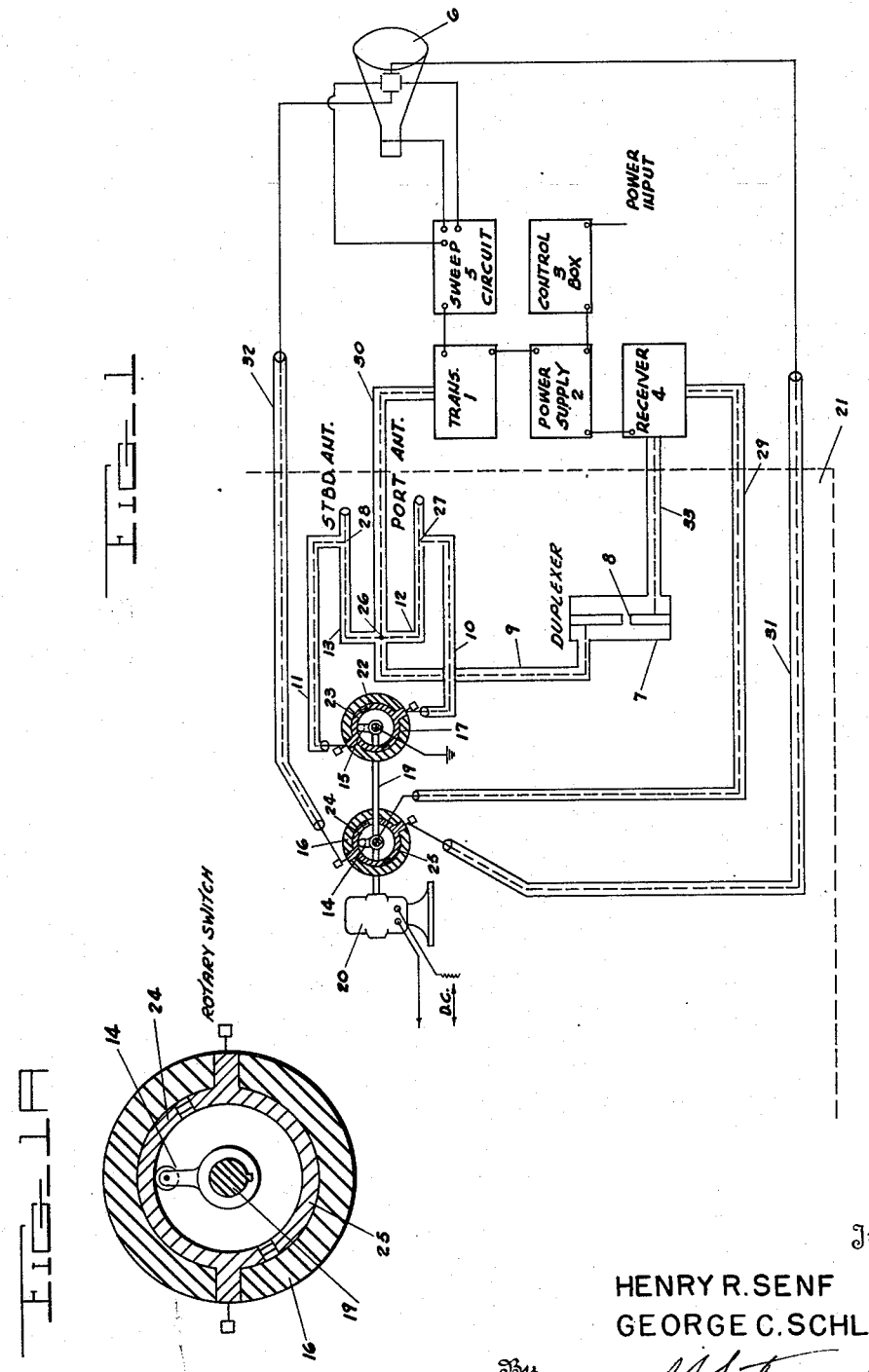

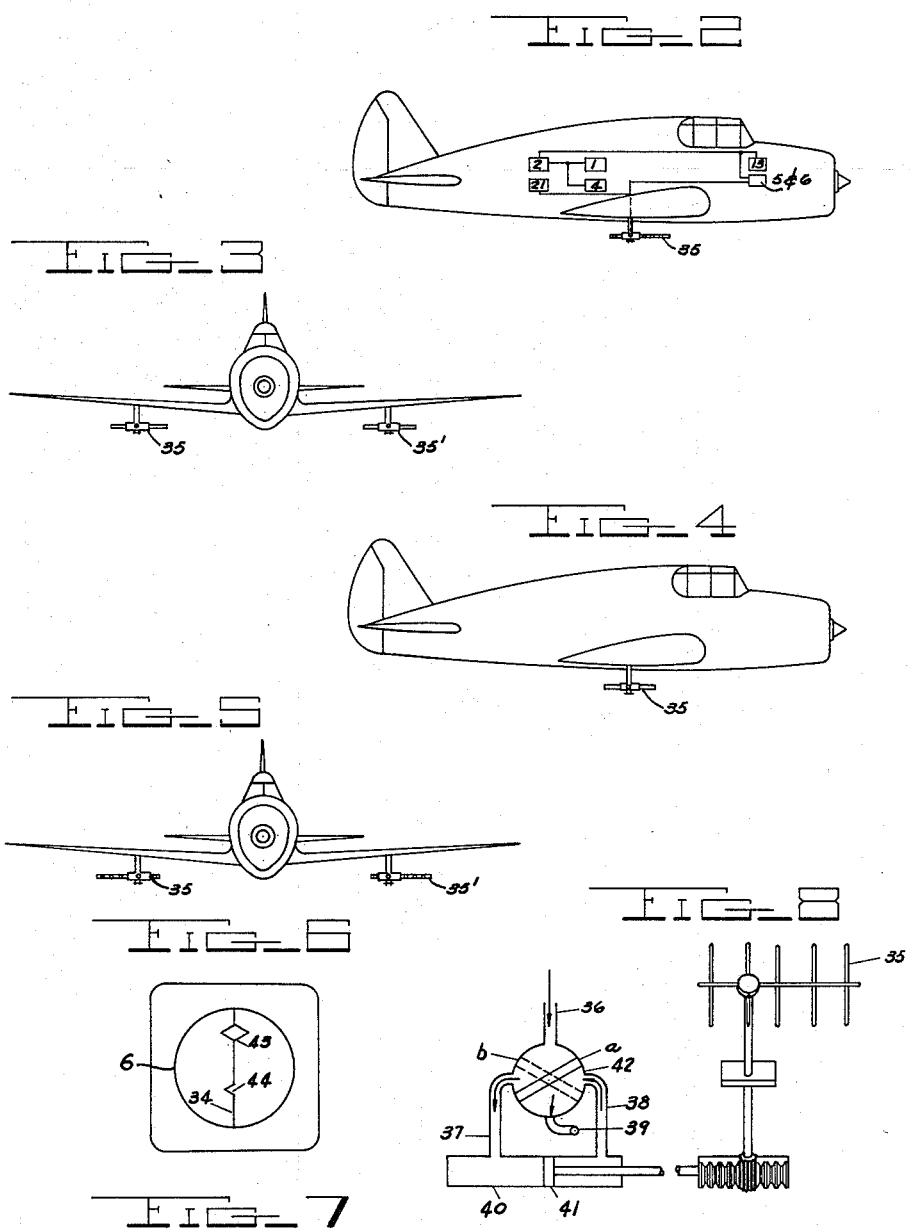

2,546,170

UNITED STATES PATENT OFFICE 2,546,170

RADIO ECHO SYSTEM FOR AIRCRAFT

George C. Schleter and Henry R. Senf, Washington, D. C.

Application December 7, 1942, Serial No. 468,106

5 Claims. (Cl. 343—11)

(Granted under the act of March 3, 1883, as amended April 30, 1928; 370 O. G. 757)

This invention relates broadly to radio echo apparatus and more particularly to such apparatus applicable to aircraft.

It is well realized by those skilled in the art that great quantities of time, men and equipment are required in order to patrol large expanses of water and coast line with the ordinary surface vessel. While these quantities have been greatly reduced by using a few airplanes they can be further reduced by using still fewer airplanes with modern day radio ranging equipment installed thereon. The results obtained from this last mentioned system have been very satisfactory, but the system itself suffers from one serious drawback, namely, the fact that a great deal of radio apparatus is required in order to successfully complete this operation. The procedure normally followed by aircraft performing patrolling duties with radio apparatus consists of transmitting a series of pulses from antennas positioned on each side of the fuselage and arranged in such a manner as to direct the pulse transmission laterally from the aircraft. Now in the past in order to receive reflections of the pulses sent out it has been necessary to provide separate receiving antennas similarly oriented for each of the transmitting antennas. It has also been necessary to provide separate receiving and indicating means in order to determine from which side the craft the echo was received. After once ascertaining from which side the craft the echo was received the operator must then orient his craft on the bearing of the obstacle producing the echo and follow that bearing even though it changes until the obstacle is brought within visual range. This procedure is called homing and heretofore required a separate set of antennas which included a transmitting antenna located centrally and forwardly on the craft and having a wide blunt directive pattern and a pair of receiving antennas, one located on each side of the nose of the craft and having directive patterns, the major axis of which diverge approximately 15 degrees from the line of flight.

From the foregoing discussion it becomes obvious that an airplane employing this apparatus will normally have a greatly increased weight and wind resistance factor which will ultimately reduce considerably its speed and maneuverability. The instant invention has succeeded in reducing the total number of antennas required to two, which are used for both transmitting and receiving and for both searching and homing. Previous radio echo gear used in aircraft operated in the proximity of 175 megacycles but by increasing this frequency to 500 megacycles or thereabout, we have been able to reduce both the size and weight of the apparatus in addition to the aforementioned reduction in number of antennas. These two major reductions result in a more completely streamlined aircraft having less weight and wind resistance which consequently results in a greatly improved over-all efficiency and maneuverability of the aircraft itself over those heretofore obtainable.

It is therefore an object of this invention to provide a novel system of aircraft radio echo apparatus which will reduce to a minimum the total number of antennas required to perform searching and homing duties.

It is another object of this invention to provide a novel system of radio echo apparatus for aircraft facilitating the use of the same antennas for both searching and homing purposes.

It is another object of this invention to provide a novel system of aircraft radio echo apparatus for visually determining whether an obstacle lies to the port or starboard side of the craft.

Other objects of the present invention will become apparent upon a careful consideration of the following description when taken together with the accompanying drawings, in which:

Fig. 1 is a schematic diagram partly in detail of a preferred embodiment of the present invention;

Fig. 1A is a cross-sectional view taken through the annular element 16 or 17 shown in Fig. 1;

Fig. 2 is a side view of an aircraft carrying its antennas in a homing position;

Fig. 3 is a front view of the aircraft shown in Fig. 2;

Fig. 4 is a side view of an aircraft carrying its antennas in a searching position;

Fig. 5 is a front view of the aircraft shown in Fig. 4;

Fig. 6 is a typical view of a reflected image appearing on the indicating means when the aircraft is searching;

Fig. 7 is a typical view of an image appearing on the indicating means when the aircraft is homing, and Fig. 8 is a perspective view of one type antenna and hydraulic rotating means therefor which may be used in this type of system.

The applicants' system of radio echo apparatus as schematically shown in Fig. 1 comprises a pulse transmitter 1, an ultra sensitive receiver 4 having a band width of sufficient breadth to pass a majority of the frequency components accompanying a radio pulse, a pair of directive antennas 35 and 35' (not shown here) which are preferably rotatably mounted on the wing or fuselage of the craft, an indicator 6 and sweep circuit 5 such as those usually employed in a radio echo system of this type, a power supply 2, a control box 3 containing a means for switching the system off and on and a means for controlling the transmitter power and any other function that might be desirable to control at this point. The block 21 set apart from the rest of the drawing by dotted lines contains a means for converting the receiver and transmitter operation from one antenna to the other and also a mechanism for automatically decoupling the receiver from the antenna during the operation of the transmitter and vice versa.

The antenna decoupling device 7 is of substantially the same character as that set forth in the application of Arthur A. Varela and Robert A. Herring, Serial No. 452,534, filed July 27, 1942. While the antenna switching mechanism enclosed in block 21 is more fully described in Patent 2,189,549 to Hershberger, issued February 6, 1940. But for the express purpose of setting forth the applicants' invention more clearly, the operation of this switching mechanism will be briefly reviewed herein by assuming two cylindrical elements of insulating material 16 and 17 each having two 160-degree to 175-degree arcs of conducting material 22, 23 and 24, 25 located diametrically opposite each other and on the inner periphery thereof. Two rolling contact-making members 14 and 15 are ganged to the same direct current motor shaft 19 and lie in the same axial plane in order to make sequential contact with the conducting members of their respective drum. Concentric lines 31 and 32 are used to tie conducting members 25 and 24 of drum 16 to their respective starboard and port deflecting plates of the oscilloscope 6. Concentric line 29 connects the output of receiver 4 to the rotating contact-making member 14 and thereby alternating supplies the port and starboard deflecting plates with image-producing energy. Concentric line 30 joins the output of transmitter 1 to the common junction point 26 of concentric lines 12 and 13 while quarter-wave line 9 connects point 26 to the input of decoupling device 7 which is connected to the input of receiver 4 through line 33 and automatically decouples the receiver from the antennas during the operative periods of the transmitter. The one-half wave lines 10 and 11 connect conducting members 22 and 23 to points 27 and 28, respectively, of concentric lines 12 and 13 at a point one quarter-wave length displaced from the common junction point 26. The contact-making member 15 of drum 17 is grounded and virtually grounds points 27 and 28 alternately as it rotates around its corresponding drum since connecting lines 10 and 11 are one-half wave in length.

This invention may be more clearly understood by first assuming that the airplane is flying along with its antennas oriented in a searching position as shown in Figs. 4 and 5. The transmitter 1 is keyed and the energy pulse flows through line 30 to point 26 where it appears to have 3 paths which it may follow, that is through lines 9, 12 or 13. This pulse of energy at point 26 fires spark gap 8 and thereby limits the amount of energy which may follow line 9. The small amount of energy that does flow through this path, however, produces an input to receiver 4 which is amplified and passed through line 29, contacts making arm 14 and line 32 to the port deflecting plate and thus produces an image of the transmitted pulse. Little or no energy will flow through line 13 since point 28 is virtually grounded by the action of contact-making arm 15 and half-wave line 11 which will automatically present a high impedance to line 13 at point 26 since grounded point 28 is one-quarter wave from point 26. Obviously the one remaining path is through line 12 to the port antenna. This pulse is transmitted out in a lateral direction and if an obstacle is present the pulse will be reflected back to the same antenna. The speed of contact-making members 14 and 15 is relatively slow so that by the time the reflected pulse reaches the port antenna the transmitter is idle and members 14 and 15 are still in contact with conducting members 23 and 24. Thus the reflected energy pulse reaches point 26 and again has 3 paths which it may follow, through lines 30, 12 and 9.

Little or no energy will flow through line 30 to the transmitter because the length of this line is so selected as to present a high impedance looking toward the transmitter from point 26. Little or no energy will flow through line 13 to the starboard antenna because of the action of the grounded contact member 15, as was previously stated. So the remaining path is through line 9 and the decoupling device 7 which is now acting as a coupling transformer to the receiver input, since spark gap 8 is now quiescent and acting as a resonating capacitance of device 7. The input energy to the receiver is amplified and passed through line 29, contactor 14 and line 32 to the port deflecting plate. The speed of rotation of contactors 14 and 15 is so selected that the transmission and reception of pulses is carried on from each antenna 3 or 4 times per revolution thereby allowing a continuous indication of the range or rate of change of range.

Now referring to Fig. 6 which illustrates a typical indication an operator might see while searching. The image 43 represents the transmitted pulse which occurs on both of the port and starboard side of the oscilloscope while a reflected pulse will occur only on the side corresponding to the obstacle as shown by 44 in Fig. 6. When an indication like this appears on the oscilloscope the operator orients his plane in the direction of the obstacle and simultaneously rotates the antennas 75 degrees or thereabout from the lateral position so that the transmitted patterns from both antennas have a slight overlap and diverge about 15 degrees from the line of flight. The operator then guides his craft to produce an equal reflection on each side of the oscilloscope or to a point where the energy reflected to each antenna is equal thereby insuring that the obstacle lies dead ahead. A typical example of direct bearing on an obstacle is shown in Fig. 7. If the airplane deviates from this bearing the reflected images on the oscilloscope will become unequal in size, that on the side of the obstacle becoming the larger. In each of the illustrations shown in Figs. 6 and 7, the vertical line 34 represents the time base generated by the action of the sweep circuit 3.

Referring now more particularly to the antenna and hydraulic rotating means shown in Fig. 8. With the valve 42 in position $a$ the oil pressure applied to the cylinder 40 through pipe 36 causes the piston 41 to move to the right thereby rotating antenna 35 or 35' in a clockwise direction. The exhaust from the forward motion of piston 41 is allowed to pass through pipes 38 and 39 by the action of valve 42. When the valve is in position b counterclockwise motion of the antenna will ensue.

It must be understood that even though we have shown and described certain and specific embodiments of this invention, we are fully aware of the many modifications possible thereof. Therefore, this invention is not to be restricted except insofar as is necessitated by the prior art and the spirit of the appended claims.

The invention described herein may be manufactured and used by or for the Government of the United States of America for governmental purposes without the payment of any royalties thereon or therefore.

We claim:

1. A radio echo searching and homing system for use on aircraft, comprising a pair of directive antennas, means for moving said antennas at will and simultaneously from a position in which the directive axis of each of said antennas extends substantially normal to the line of flight of said aircraft to a position in which said directive axis extend forwardly of said aircraft to allow a slight overlap of the beam patterns of said antennas. a radio pulse transmitter, a receiver. an oscilloscope, a sweep circuit synchronized with said transmitter and operable to move the electron beam of said oscilloscope along a diameter of the viewing screen thereof, and a switching means for coupling the output of said transmitter and the input of said receiver first to one of said antennas and then to the other and sequentially and simultaneously connecting the output of said receiver to said oscilloscope in such a manner as to render the indication produced on said oscilloscope by the reception of a signal by said receiver indicative of the antenna which was in use at its reception.

2. A radio echo searching and homing system for use on aircraft, comprising a pair of directive antennas, means for moving said antennas at will and simultaneously from a position in which the directive axis of each of said antennas extends substantially normal to the line of flight of said aircraft to a position in which said directive axis extend forwardly of said aircraft to allow a slight overlap of the beam patterns of said antennas, a radio pulse transmitter. a receiver, an indicator, means producing on said indicator an indication of the reception of a radio pulse echo by said receiver, said indication having characteristics distinctive of the antenna in use when it was received and means for sequentially coupling both the output of said transmitter and the input of said receiver first to one of said antennas and then to the other.

3. A radio echo searching and homing system for use on aircraft, comprising a pair of directive antennas, means for moving said antennas at will and simultaneously from a position in which the directive axis of each of said antennas extends substantially normal to the line of flight of said aircraft to a position in which said directive axis extend forwardly of said aircraft to allow a slight overlap of the beam patterns of said antennas, a radio pulse transmitter, a receiver, an oscilloscope, a sweep circuit synchronized with said transmitter and operable to move the electron beam of said oscilloscope along a diameter of the viewing screen thereof, a pair of beam deflection means for said oscilloscope each operable upon reception of a voltage pulse from the output of said receiver to deflect said electron beam in a direction substantially normal to said diameter and opposite to the beam deflection produced by the other, and means for sequentially coupling both the output of said transmitter and the input of said receiver first to one of said antennas and then to the other, and simultaneously impressing the output of said receiver upon said beam deflection means in the same sequential alternation and a synchronism therewith.

4. A radio echo searching and homing system for use on aircraft, comprising a pair of directive antennas, means for moving said antennas at will and simultaneously from a position in which the directive axis of each of said antennas extends substantially normal to the line of flight of said aircraft to a position in which said directive axis extend forwardly of said aircraft to allow a slight overlap of the beam patterns of said antennas, a radio pulse transmitter, a receiver, an oscilloscope, a sweep circuit synchronized with said transmitter and operable to move the electron beam of said oscilloscope along a diameter of the viewing screen thereof, a pair of beam deflection means for said oscilloscope each operable upon reception of a voltage pulse from the output of said receiver to deflect said electron beam in a direction substantially normal to said diameter and opposite to the beam deflection produced by the other, and means for sequentially coupling both the output of said transmitter and the input of said receiver first to one of said antennas and then to the other, and simultaneously impressing the output of said receiver upon said beam deflection means in the same sequential alternation and in synchronism therewith, said beam deflection produced by the echo output of said receiver being equal on both sides of said diameter when said antennas are placed in a forwardly directed position and said echo producing object lies in the direct line of flight of said aircraft.

5. A radio echo searching and homing system for use on aircraft, comprising a pair of directive antennas, means for moving said antennas at will and simultaneously from a position in which the directive axis of each of said antennas extends substantially normal to the line of flight of said aircraft to a position in which said directive axis extend forwardly of said aircraft to allow a slight overlap of the beam patterns of said antennas, a radio pulse transmitter, a receiver, an oscilloscope, a sweep circuit synchronized with said transmitter and operable to move the electron beam of said oscilloscope along a diameter of the viewing screen thereof, a pair of beam deflection means for said oscilloscope each operable upon reception of a voltage pulse from the output of said receiver to deflect said electron beam in a direction substantially normal to said diameter and opposite to the beam deflection produced by the other, and means for sequentially coupling both the output of said transmitter and the input of said receiver first to one of said antennas and then to the other, and simultaneously impressing the output of said receiver upon said beam deflection means in the same sequential alternation and in synchronism therewith, said beam deflection produced by the echo output of said receiver being entirely on one side of said diameter when said antennas lie substantially normal to the line of flight of said craft.

GEORGE C. SCHLETER.
HENRY R. SENF.

REFERENCES CITED

The following references are of record in the file of this patent:

UNITED STATES PATENTS

| Number | Name | Date |
|---|---|---|
| 2,055,883 | Terry | Sept. 29, 1936 |
| 2,189,549 | Hershberger | Feb. 6, 1940 |
| 2,223,224 | Newhouse | Nov. 26, 1940 |
| 2,281,274 | Dallenbach et al. | Apr. 28, 1942 |
| 2,412,702 | Wolff | Dec. 17, 1946 |
| 2,412,703 | Wolff | Dec. 17, 1946 |
| 2,424,984 | Hoffman | Aug. 5, 1947 |
| 2,426,218 | Hopgood | Aug. 26, 1947 |